United States Patent
Takahashi et al.

(10) Patent No.: US 8,841,577 B2
(45) Date of Patent: Sep. 23, 2014

(54) LASER LAP WELDING METHOD FOR PARTS MADE OF GALVANIZED STEEL SHEET

(75) Inventors: Masahiro Takahashi, Hamamatsu (JP); Tsukasa Hagihara, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 307 days.

(21) Appl. No.: 13/279,775

(22) Filed: Oct. 24, 2011

(65) Prior Publication Data
US 2012/0097650 A1 Apr. 26, 2012

(30) Foreign Application Priority Data
Oct. 25, 2010 (JP) ................. 2010-238419

(51) Int. Cl.
| | | |
|---|---|---|
| B23K 26/28 | (2014.01) | |
| B23K 26/32 | (2014.01) | |
| B23K 33/00 | (2006.01) | |
| B23K 26/24 | (2014.01) | |

(52) U.S. Cl.
CPC ......... *B23K 26/3293* (2013.01); *B23K 2201/18* (2013.01); *B23K 33/00* (2013.01); *B23K 26/246* (2013.01); *B23K 2203/04* (2013.01)
USPC ................................. 219/121.64

(58) Field of Classification Search
CPC .......... B23K 26/3286; B23K 26/3293; B23K 26/246; B23K 2201/006; B23K 2201/18; B23K 2201/185; B23K 33/00; B23K 2203/04
USPC ................................. 219/121.64
See application file for complete search history.

(56) References Cited

U.S. PATENT DOCUMENTS

| 5,104,032 A | 4/1992 | Spies et al. |
| 5,626,776 A * | 5/1997 | Morris, Jr. ............... 219/121.64 |
| 2005/0011869 A1* | 1/2005 | Maura et al. ............. 219/121.64 |

(Continued)

FOREIGN PATENT DOCUMENTS

| CN | 1507380 A | 6/2004 |
| CN | 1608302 A | 4/2005 |

(Continued)

OTHER PUBLICATIONS

Machine translation of Japan Patent document No. 2001-162,388, May 2014.*

(Continued)

*Primary Examiner* — Geoffrey S Evans
(74) *Attorney, Agent, or Firm* — Lerner, David, Littenberg, Krumholz & Mentlik, LLP

(57) ABSTRACT

A laser lap welding method for parts made of galvanized steel sheet includes steps of press-forming two parts from galvanized steel sheet such that the two parts include elongated joining regions to be welded together on mutually opposed surfaces thereof and a plurality of protrusions are formed on at least any one of the joining regions of the two parts at predetermined intervals in a longitudinal direction of the joining region; retaining the two parts in a state in which the joining regions are overlapped one on the other such that a gap according to a height of the protrusions is formed between the joining regions; and irradiating a laser onto one surface of the overlapped joining regions of the two parts such that the overlapped joining regions are fused and welded by energy of the laser, and zinc gas produced with fusing is discharged through the gap.

4 Claims, 4 Drawing Sheets

(56) References Cited

U.S. PATENT DOCUMENTS

| | | | |
|---|---|---|---|
| 2005/0152741 A1* | 7/2005 | Fujimoto et al. | 219/121.64 |
| 2006/0175310 A1 | 8/2006 | Fujimoto et al. | |
| 2006/0231534 A1* | 10/2006 | Hill | 219/121.64 |
| 2007/0084835 A1* | 4/2007 | Dinauer et al. | 219/121.64 |
| 2008/0217307 A1* | 9/2008 | Dauvel et al. | 219/121.64 |
| 2009/0134131 A1* | 5/2009 | Lee et al. | 219/121.64 |
| 2009/0266801 A1* | 10/2009 | Oku et al. | 219/121.64 |
| 2011/0278266 A1* | 11/2011 | Kobayashi et al. | 219/121.64 |

FOREIGN PATENT DOCUMENTS

| | | | |
|---|---|---|---|
| DE | 10048233 A1 | | 4/2002 |
| DE | 10331745 A1 | | 2/2005 |
| FR | 2731373 A1 | | 9/1996 |
| JP | 61-135495 A | * | 6/1986 |
| JP | 3-193285 A | | 8/1991 |
| JP | 04231190 A | | 8/1992 |
| JP | 02571976 B2 | | 1/1997 |
| JP | 10-216974 A | | 8/1998 |
| JP | H10216974 A | | 8/1998 |
| JP | 11-226765 A | * | 8/1999 |
| JP | 2000-326080 A | * | 11/2000 |
| JP | 2001-162388 A | * | 6/2001 |
| JP | 2001162391 A | | 6/2001 |
| JP | 2005144504 A | | 6/2005 |
| JP | 03763525 B2 | | 4/2006 |
| JP | 2009255179 A | | 11/2009 |
| WO | WO-2010/084665 A | * | 7/2010 |

OTHER PUBLICATIONS

Machine translation of Japan Patent document No. 2009-255,179, May 2014.*

German Office Action for Application No. DE 10 2011 054 542.5 dated Mar. 2, 2012.

German Office Action for Application No. DE 10 2011 054 540.9 dated Mar. 2, 2012.

Chinese Office Action for Application No. 201110332477.6 dated Feb. 8, 2014.

Japanese Office Action for Application No. 2010-238419 dated May 8, 2014.

Chinese Office Action for Application No. 201110332574.5 dated Nov. 29, 2013.

machine translation of Japan Patent Document No. 2001-162,388, Jun. 2001.

* cited by examiner

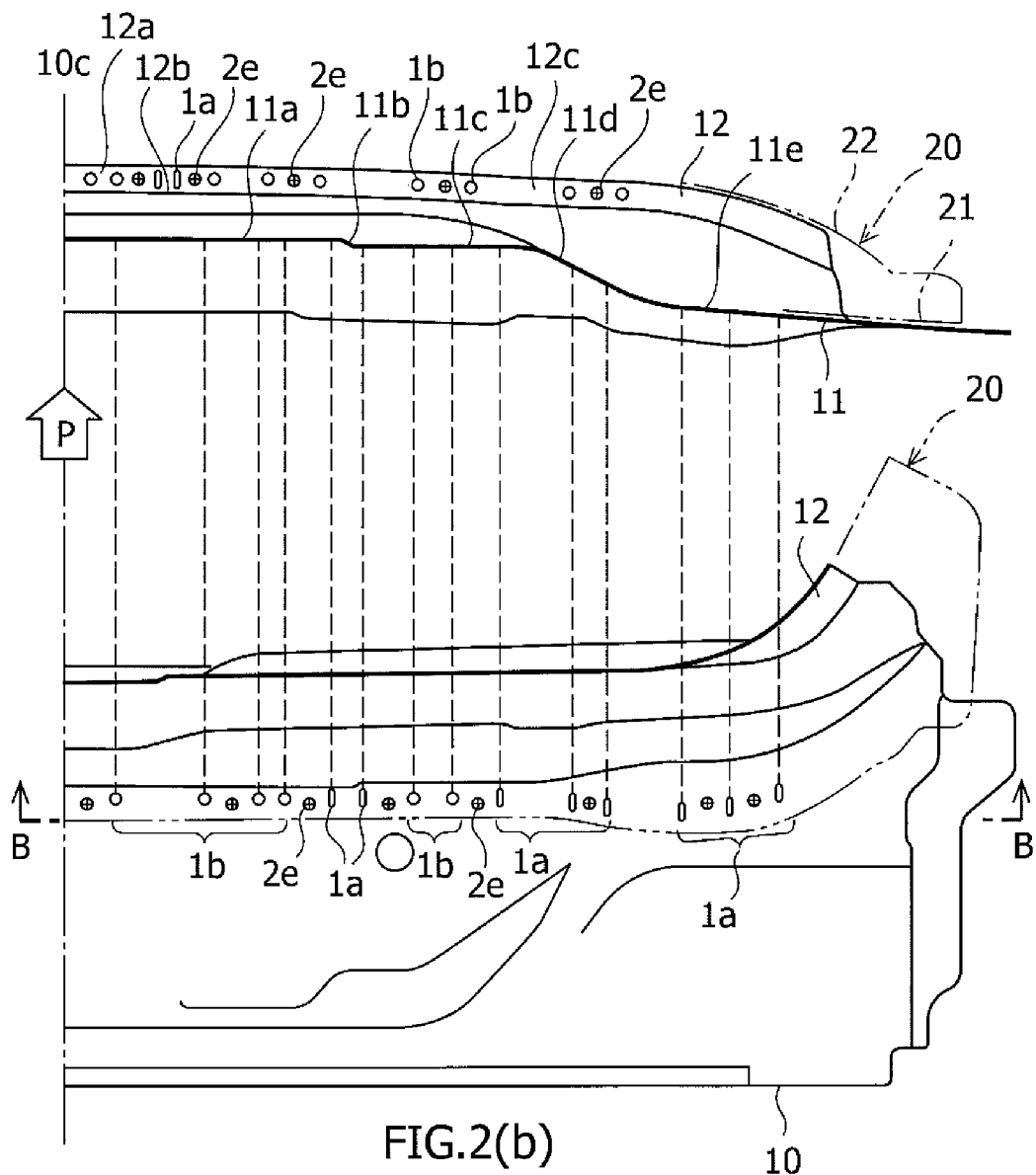
FIG.2(a)
FIG.2(b)
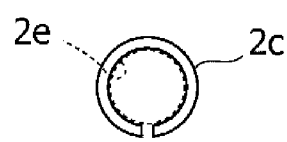
FIG.2(c)

LASER LAP WELDING METHOD FOR PARTS MADE OF GALVANIZED STEEL SHEET

CROSS-REFERENCE TO RELATED APPLICATIONS

The present application claims priority from Japanese Patent Application No. 2010-238419, filed in the Japanese Patent Office on Oct. 25, 2010, the disclosure of which is hereby incorporated herein by reference.

BACKGROUND OF THE INVENTION

The present invention relates to a laser lap welding method for parts made of galvanized steel sheet, or more specifically, to a laser lap welding method suitable as an alternative technique to be carried out in place of spot welding.

Galvanized sheets are used in many portions of vehicle bodies of automobiles in consideration of corrosion resistance. Panels made of galvanized sheets to form vehicle body parts are press-formed into three-dimensional shapes and are welded together at peripheral portions of such three-dimensional shapes, and thereby form a vehicle body structure based on a hollow cross-section which has an advantage in strength. Generally, such vehicle body panels have been integrated mainly by means of spot welding. However, laser welding is now being introduced as an alternative technique that allows processing at a higher speed.

It is known that vaporized zinc may cause welding failures such as blowholes when galvanized sheets are closely overlapped and welded to each other using a laser, as the vaporized zinc may blow fused metal away or may remain in the fused metal as bubbles. To avoid this problem, JP10-216974A and JP2571976B disclose a technique in which protrusions are formed on any one of galvanized sheets to form a gap for discharging the zinc vapor in a state in which the sheets are overlapped on each other.

Since a vehicle body panel of an automobile is formed by press forming, protrusions are formed on such pressed parts by subjecting the parts to an embossing process with punches arranged inside a press die after a press forming process. However, in the case of employing laser welding for parts originally designed to be suitable for spot-welding, the following problems occur because such parts are not designed to allow arrangement of the protrusions necessary for laser welding. For example, the protrusions cannot be disposed due to limited space and presence of inclinations on a joining surface, or welding positions need to be changed because of the protrusions added.

If the welding positions are changed, a strength performance and an impact resistance performance as a vehicle body structure are changed. For this reason, the structure will need to undergo performance confirmation tests again. Moreover, the parts that are newly designed cannot directly utilize design data which have been accumulated on the premise of spot welding. Such problems have been considerable obstacles to introduction of laser welding.

BRIEF SUMMARY OF THE INVENTION

The present invention has been made in view of the above-described circumstances, and an object thereof is to provide a laser lap welding method which is capable of achieving a performance similar to that of spot welding under a joining condition based on spot welding, and which is suitable for an alternative technique to be carried out in place of spot welding.

In order to solve the above-described problems, a laser lap welding method for parts made of galvanized steel sheet, including the steps of: press-forming two parts (10, 20) from galvanized steel sheet such that the two parts include elongated joining regions (11, 21) to be welded together on mutually opposed surfaces thereof and a plurality of protrusions (1) are formed on at least any one of the joining regions (11) of the two parts at predetermined intervals in a longitudinal direction of the joining region; retaining the two parts in a state in which the joining regions are overlapped one on the other such that a gap (g) according to a height of the protrusions is formed between the joining regions; and irradiating a laser (2a) onto one surface of the overlapped joining regions of the two parts such that the overlapped joining regions are fused and welded (2) by energy of the laser, and zinc gas produced with fusing is discharged through the gap, wherein each of the protrusions is located between unit spots (2e) each of which is equivalent to an individual welding spot when the two parts are spot-welded, and is formed into a ridge-shape (1a) extending in a substantially orthogonal direction to the longitudinal direction of the joining regions (11, 12), and wherein the step of irradiating the laser includes discrete unit laser scanning (2c) each of which is scanned along a curved line surrounding the unit spot (2e).

According to this method, the multiple protrusions provided between the unit spots used for performing unit laser scanning described above are formed as the ridge-shaped protrusions extending in the substantially orthogonal direction to the longitudinal direction of the joining regions, and thereby, an even gap can be stably formed between the joining regions toward lateral and outside of the joining regions so as to be able to discharge zinc vapor, and laser welding can be achieved favorably without causing welding failures such as blowholes.

Moreover, the ridge-line protrusions require small areas in a direction of arrangement of unit laser scanning, and can be formed without affecting the layout of the unit spots equivalent to welding spots for spot welding. The unit laser scanning along a curved line surrounding the unit spot can be performed within a substantially equivalent area of the unit spot, and thus, it is possible to obtain joining strength which is equivalent to the case of spot-welding two parts.

Consequently, it is possible to utilize existing design data accumulated on the assumption of spot welding. This is advantageous for introducing laser welding as an alternative technique to replace spot welding. Lower power consumption is another advantage because minimum laser scanning is required therein. Meanwhile, laser welding does not cause a problem such as a non-effective shunt current to a welded spot as observed in spot welding. Accordingly, it is also possible to enhance joining strength locally by adding laser scanning to spaces between the unit spots.

In the laser lap welding method according to the present invention, it is preferable that the plurality of protrusions (1) further include trapezoidal protrusions (1b) each having a flat top surface; an interval between the ridge-shaped protrusions (1a) adjacent to one another is equal to or less than five times as long as a diameter of the unit spots (2e); and both, an interval between the ridge-shaped protrusion (1a) and the trapezoidal protrusion (1b) adjacent to one another, and an interval between the adjacent trapezoidal protrusions (1b), are equal to or less than ten times as long as the diameter of the unit spots (2e).

If the gap between the mutually adjacent ridge-line protrusions is equal to or less than five times as long as the diameter of the unit spot in the step of retaining the two parts in the overlapped state, then it is possible to avoid a gap shortage due to warpage of the joining regions, and thereby to avoid inhibition of discharge of zinc vapor at the time of welding, even when the joining regions between the adjacent ridge-line protrusions are formed of flanges of thin steel plates, for example. Furthermore, when a continuous flat portion is formed between the multiple unit spots on the joining region of one of the parts, it is possible to improve supporting stability relative to a joining region of the other part in the step of retaining the two parts in the overlapped state by forming the trapezoidal protrusions instead of the ridge-shaped protrusions. Hence, the gap can be formed by omitting the ridge-shaped protrusions adjacent to the trapezoidal protrusions, thereby reducing the number of protrusions to be formed.

The laser lap welding method according to the present invention is particularly performed preferably when the two parts are panels forming a vehicle body of an automobile, and at least one of the joining regions is a flange provided along a periphery of corresponding one of the panels.

As described above, according to the laser lap welding method for parts made of galvanized steel sheet according to the present invention, an even gap for discharging zinc vapor can be formed stably between joining regions of pressed parts having three-dimensional shapes including many inclined surfaces and curved surfaces, and thereby excellent welding quality can be achieved. Moreover, laser lap welding can be performed under minimum required welding conditions while maintaining similar performances and quality to those attained by spot welding. Therefore, laser lap welding can be introduced at low cost as an alternative technique in place of spot welding.

BRIEF DESCRIPTION OF THE DRAWINGS

FIG. 2A is a cross-sectional view taken along line B-B in FIG. 2B, FIG. 2B is a front view showing the parts made of galvanized steel sheet to be subjected to laser lap welding according to the present invention, and FIG. 2C is an enlarged view of unit laser welding.

DETAILED DESCRIPTION

An embodiment of the present invention will be described below in detail with reference to the accompanying drawings.

Figure 1A:
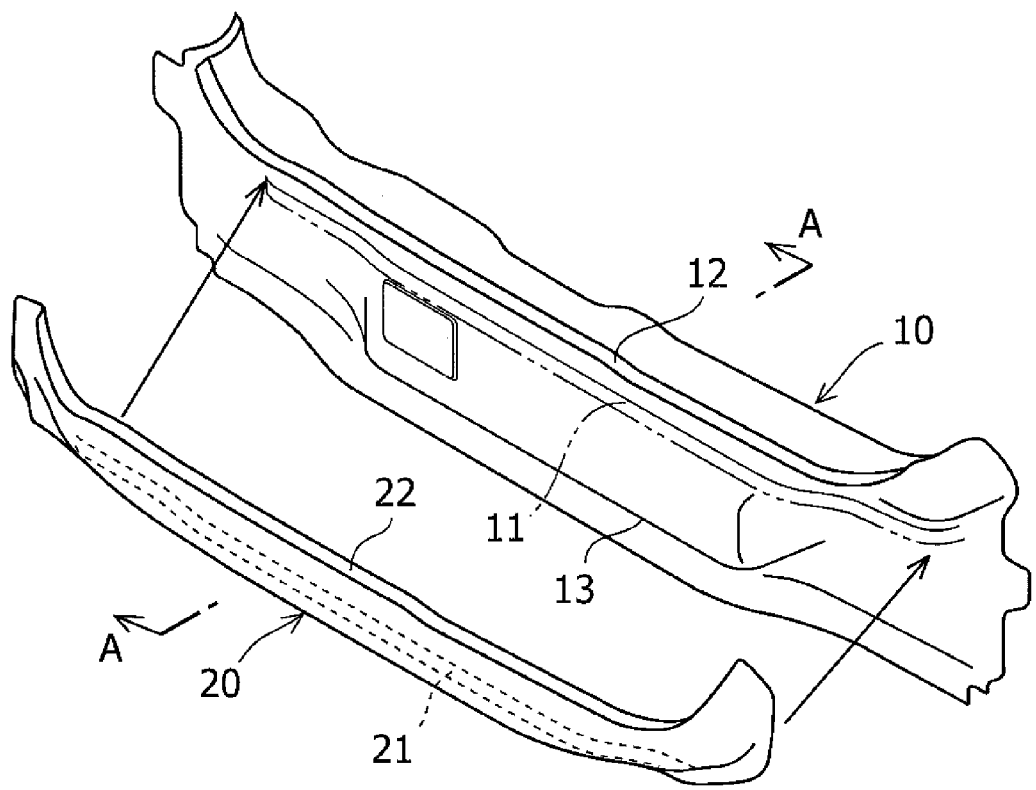
FIG. 1A is a perspective view showing parts made of galvanized steel sheet to be subjected to laser lap welding according to the present invention before being joined to each other.
Figure 1B:
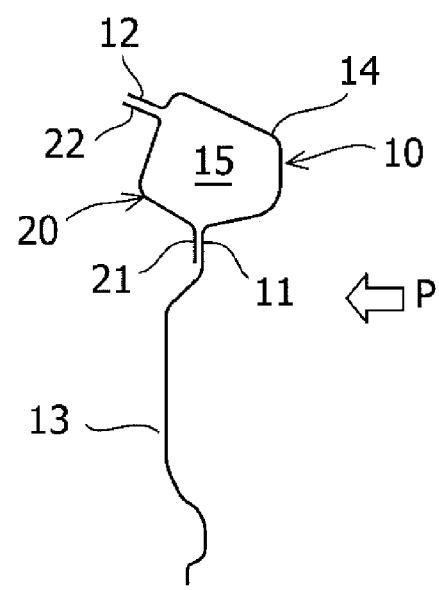
FIG. 1B is a cross-sectional view of the parts made of galvanized steel sheet after being joined to each other, which is taken along line A-A in FIG. 1A.

FIG. 1A shows a rear skirt 10 to be located below a back door opening (or a trunk lid opening) of an automobile and a tail end member to be joined to an upper outer surface side of the rear skirt 10, before being joined to each other, both of which represent an example of parts made of galvanized steel sheet to be subjected to laser lap welding according to the present invention. Meanwhile, FIG. 1B shows the parts made of galvanized steel sheet after being joined to each other.

The rear skirt 10 has a flange 12 on an upper edge portion thereof. The flange 12 extends in a vehicle width direction and projects toward the rear of the vehicle. An elongated joining region 11 extending in the vehicle width direction is formed on the lower side of the flange 12. A channel structure 14 extending in the vehicle width direction is formed between the joining region 11 and the flange 12. The channel structure 14 has U-shaped cross section opened toward the rear of the vehicle. A portion below the joining region 11 of the rear skirt 10 is practically the portion forming the rear skirt, and a central part in the vehicle width direction thereof is formed into a swelled portion 13 which is swelled toward the rear of the vehicle so as to form a rear wall portion of a spare tire housing (not shown).

A tail end member 20 has flanges 21 and 22. The flange 22 is formed on an upper edge portion of the tail end member 20. The flange 22 extends in the vehicle width direction and projects toward the rear of the vehicle. The flange 21 is formed on a lower end portion of the tail end member 20, and extends in the vehicle width direction and projects downward thereof. Then, as shown in FIGS. 1A and 1B, the flange 22 of the tail end member 20 is lapped over a lower surface of the flange 12 of the rear skirt 10, and the flange 21 of the tail end member 20 is lapped over the joining region of the rear skirt 10. By subjecting the overlapped portions to laser lap welding, as described later, a closed cross section 15 that extends in the vehicle width direction is formed between the channel structure 14 of the rear skirt and the tail end member 20. Meanwhile, the welded and joined flanges 12 and 22 collectively form part of a back door opening flange which extends along a lower edge of the back door opening.

In order to introduce gaps for discharging zinc vapor generated at the time of laser lap welding between the respective overlapped portions 11, 21 and 12, 22, a large number of protrusions 1 (1a, 1b) are formed on the joining region 11 and the lower surface of the flange 12 of the rear skirt 10 while providing intervals in an longitudinal direction thereof.

These protrusions 1 (1a, 1b) are formed between unit spots indicated by reference numeral 2e in FIGS. 2A and 2B, that is, the unit spots 2e corresponding to individual welding sports used when spot-welding the rear skirt 10 and the tail end member 20 together, so as to stay away from the unit spots 2e. When performing laser welding, unit laser scanning 2c is performed on each of the unit spots 2e, the unit laser scanning 2c drawing a circular shape (a curved line shape or a C-shape) surrounding the unit spot 2e, as shown in FIG. 2C. In this way, it is possible to obtain joining strength equivalent to the case of spot-welding two parts.

The joining occurs in the entire part inside the unit spot 2e in the case of spot welding, whereas only the periphery of the unit spot 2e is joined in unit laser scanning 2c described above without causing any joining inside the unit spot 2e. However, laser welding achieves deeper fusion of the metal compared to spot welding. Hence, it is confirmed that joining strength at least equivalent to the strength obtained by spot welding can be obtained by unit laser scanning 2c in a circular shape as described above.

Here, it is also possible to obtain joining strength at least equivalent to the strength obtained by spot welding by means of performing unit laser scanning in a curved line shape or a straight line shape to obtain a bead area equivalent to the unit spot 2e instead of performing unit laser scanning 2c as described above. However, if unit laser scanning is performed in the shape protruding significantly from the unit spot 2e, a strength performance may change because such a configuration is practically the same as displacement of the unit spot 2e. This problem is also related to the shapes of the protrusions 1 (1a, 1b). This point will be described later.

Figure 3A:
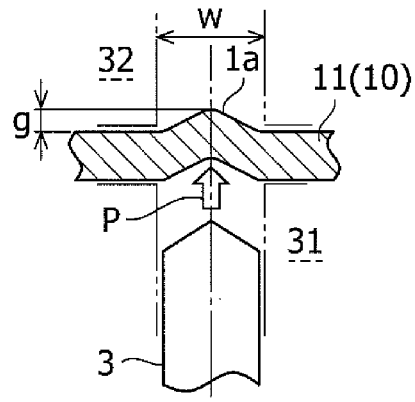
FIG. 3A is a cross-sectional view showing an embossing process of a ridge-line protrusion.

The rear skirt 10 is formed by press-forming a blank galvanized sheet, and then the protrusions 1 (1a, 1b) are formed by use of punches 3 attached to a press die for an embossing process. Although FIG. 3A is illustrated upside down in comparison with the actual process, the protrusion 1 (1a) is formed by setting the rear skirt 10 on a lower die including a die 32 with a hole drilled in a position corresponding to a processing region, and then sending the punch 3 out of a hole drilled in an upper die 31 (a holding block), so that the punch 3 pushes the steel plate 11 into the hole in the die 32.

Figure 3B:
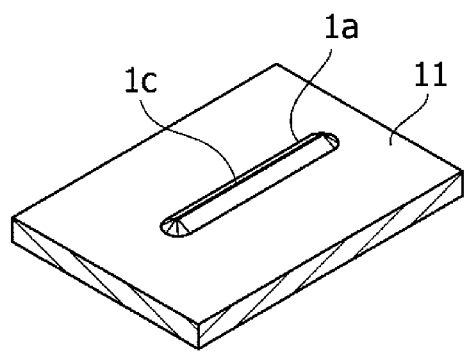
FIG. 3B is a perspective view showing the ridge-line protrusion.
Figure 3C:
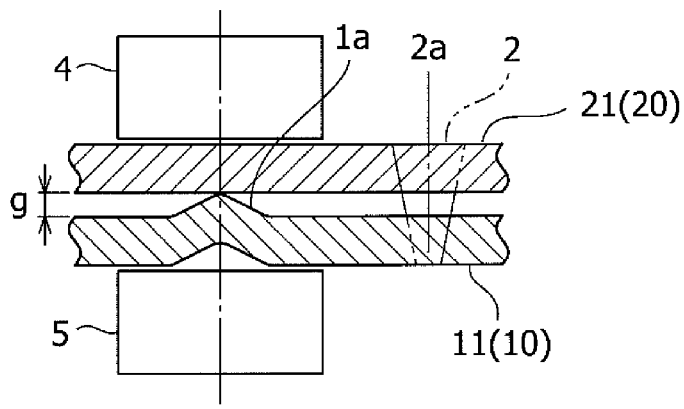
FIG. 3C is a cross-sectional view showing a clamped state of the ridge-line protrusion.
Figure 4A:
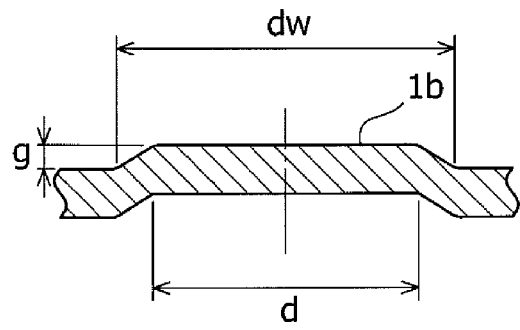
FIG. 4A is a cross-sectional view and FIG. 4B is a perspective view showing a trapezoidal protrusion.
Figure 4B:
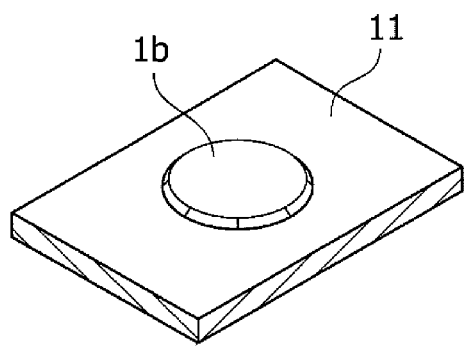

Each of the protrusions 1 (1a, 1b) is formed either into a ridge-shaped protrusion 1a as shown in FIGS. 3A to 3C and FIGS. 5A and 5B or into a trapezoidal protrusion 1b as shown in FIGS. 4A and 4B, depending on the shapes of the joining region 11 and the flange 12 as well as positional relationships with the unit spots 2e.

The ridge-shaped protrusion 1a includes a ridge line 1c extending in an orthogonal direction to the longitudinal direction of the elongated joining region 11 and the flange 12 as shown in FIG. 3B. The ridge line 1c is obtained by forming the ridge-shaped protrusion 1a by the embossing process using the punch 3 with a tip having a V-shaped cross section. A minimum necessary area for this ridge-shaped protrusion 1a is the area required, in the longitudinal direction of the joining region 11 and the flange 12, and therefore the ridge-shaped protrusion 1a is suitable for a region where a sufficient space cannot be ensured due to the shape of the joining region 11 or the flange 12. Moreover, there is also an advantage that an even height g is obtained in the direction of the ridge line 1c irrespective of inclination angles of inclined surfaces 11d, 11e.

Meanwhile, the trapezoidal protrusion 1b includes a circular top surface which is flat and broad as shown in FIG. 4B. The circular top surface is obtained by forming the trapezoidal protrusion 1b by the embossing process using a punch (not shown) with a flat circular top end surface. This trapezoidal protrusion 1b has an advantage that a mating part 20 can be supported stably by use of the flat top surface. For this reason, there is an advantage that an even gap g can be maintained at the overlapped portion even by extending the intervals of the trapezoidal protrusions 1b and thereby to reduce the number of the protrusions 1 to be formed compared to locating the ridge-shaped protrusions 1a adjacent to one another. Here, the trapezoidal protrusion 1b may also be formed into shapes other than the circular shape. However, the circular shape has an advantage in light of workability.

The joining region 11 and the flange 12 of the rear skirt 10 provided with the respective protrusions 1a, 1b described above are lapped over the flanges 21 and 22 of the tail end member 20 to form the predetermined gap g in the overlapped portions. Moreover, the respective unit spots 2e shown in FIGS. 2A and 2B are subjected sequentially to unit laser scanning 2c while clamping the rear skirt 10 and the tail member 20 in multiple positions along the overlapped portions. Hence the rear skirt 10 and the tail end member 20 are welded and joined to each other. Although it is not particularly limited, remote scanner welding with an optical scanning laser welding machine utilizing a galvano scanner is preferable due to a configuration to perform unit laser scanning 2c in a constant shape repeatedly many times.

Next, the layout of the respective protrusions 1a and 1b will be described specifically. In the rear skirt 10 shown in FIGS. 2A and 2B, the trapezoidal protrusions 1b are formed on flat surfaces 11a and 11c of the joining region 11 and on flat surfaces 12a and 12c of the flange 12 because of comparatively large intervals of the unit spots 2e. Naturally, the ridge-shaped protrusions 1a may be formed on these respective surfaces instead of the trapezoidal protrusions 1b. Nevertheless, in that case, it is preferable to add any of the ridge-shaped protrusions 1a or the trapezoidal protrusions 1b to a section on the flat surface 12c and the like of the flange 12, for example, where there are large intervals between the trapezoidal protrusions 1b. In other words, some of the protrusions are omitted in this section by continuously forming the trapezoidal protrusions 1b.

On the other hand, the ridge-shaped protrusions 1a are formed on the inclined surfaces 11d and 11e of the joining region 11 irrespective of the intervals of the unit spots 2e. No trapezoidal protrusions 1b can be formed in this section. If the trapezoidal protrusions 1b are formed in this section instead of the ridge-shaped protrusions 1a, actual heights of the protrusions are changed by the inclinations of the inclined surfaces 11d and 11e. Hence, the desired gap cannot be obtained.

No protrusions can be formed on a stepped portion 11b of the joining region 11 and a stepped portion 12b of the flange 12. In addition, since these shape transformed portions 11b, 12b are important in terms of strength, welding spots (the unit spots 2e) are located comparatively close to these portions. If the trapezoidal protrusions 1b are formed adjacent to any of the shape transformed portions, or specifically, the stepped portion 12b shown in FIGS. 6A and 6B, for example, then unit laser scanning 2c surrounding the unit spots 2e cannot be carried out. Since the top surface of the trapezoidal protrusion 1b is pressed against a mating part (the flange 22) without providing any gap, zinc gas to be generated by laser irradiation cannot be discharged.

Figure 6A:
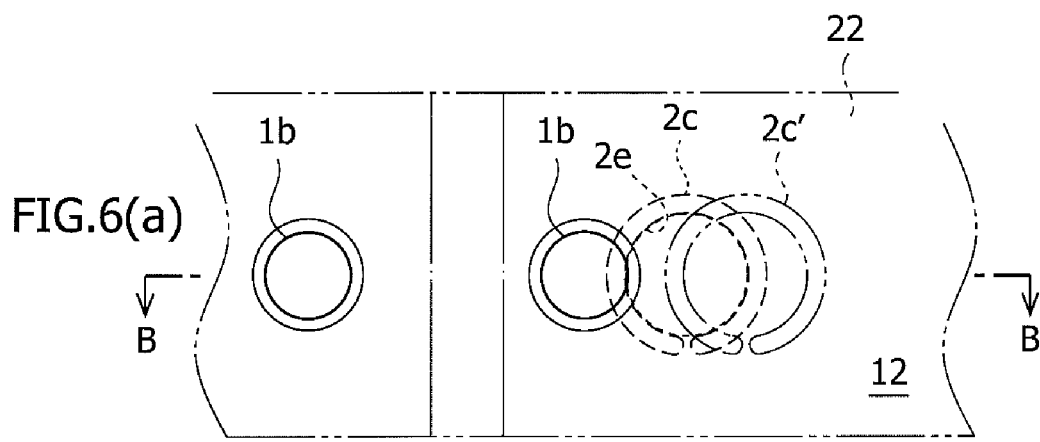
FIG. 6A is a plan view showing the trapezoidal protrusions adjacent to a stepped portion and showing unit laser scanning.
Figure 6B:
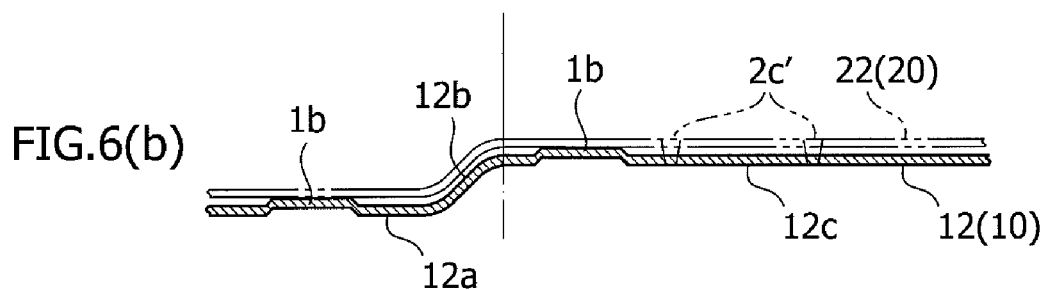
FIG. 6B is a cross-sectional view taken along a B-B line in FIG. 6A.

If unit laser scanning is performed away from the trapezoidal protrusion 1b as indicated with reference numeral 2c' in FIGS. 6A and 6B to avoid the above situation, then the welding spot (unit laser scanning 2c') is away from the stepped portion 12b. A region defined by a diameter dw=5 mm as shown in FIG. 4A is required for forming the trapezoidal protrusion 1b having a diameter d=4 mm. Furthermore, the trapezoidal protrusion 1b needs to be approximately 1 mm away from an upper end of the stepped portion 12b for stably embossing the trapezoidal protrusion 1b. As a consequence, the unit laser scanning 2c' needs to be performed at least 6 mm away from the upper end of the stepped portion 12b.

Figure 5A:
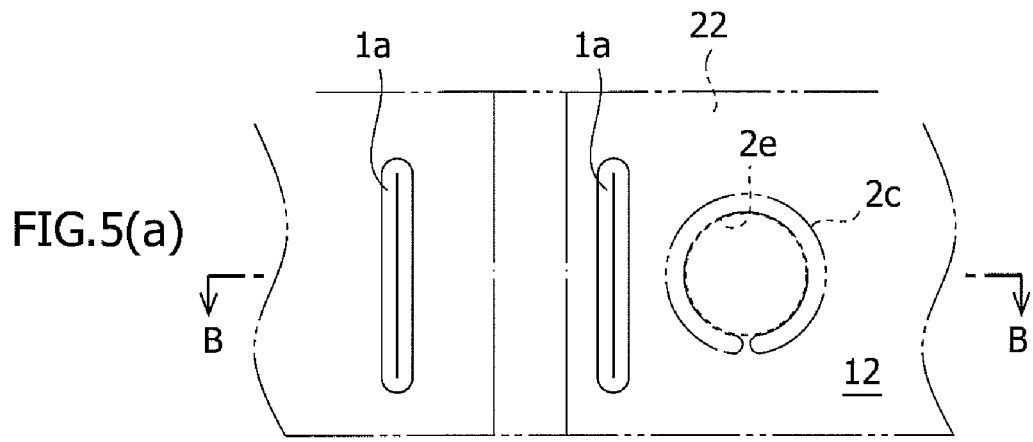
FIG. 5A is a plan view showing the ridge-shaped protrusions adjacent to a stepped portion and showing unit laser scanning.
Figure 5B:
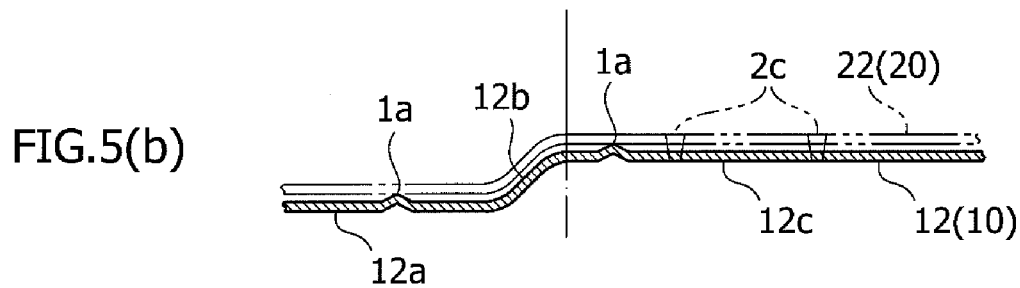
FIG. 5B is a cross-sectional view taken along line B-B in FIG. 5A.

Accordingly, at the stepped portion 11b of the joining region 11 and the stepped portion 12b of the flange 12, the ridge-shaped protrusions 1a are respectively formed on portions of the flat surfaces 11a, 11c and the 12a, 12c close to both sides of the stepped portions 11b and 12b. As shown in FIGS. 5A and 5B, in the case of the ridge-shaped protrusion 1a, unit laser scanning 2c can be performed at a position 2 to 3 mm away from the upper end of the stepped portion 12b even when embossing the protrusion 1a at a position 1 mm away from the upper end of the stepped portion 12b. A processing margin is provided in the case of typical spot welding, and the ridge-shaped protrusion 1a having a width W equal to about 1 mm can be formed within this processing margin. Therefore, it is not necessary to change the position of unit laser scanning 2c from the original position of the unit spot 2e.

In addition to the shape transformed portions such as the stepped portions 11b and 12b described above, the ridge-shaped protrusions 1a can be provided in the vicinity of the welding spots (the unit spots 2e) adjacent to ends of the flanges without changing the locations of unit laser scanning 2c or changing the strength performance.

In this embodiment, it is necessary to maintain the gap between the joining regions in a range of g=0.15±0.05 mm (0.1 to 0.2 mm) in order to obtain favorable welding quality when the length of each ridge-shaped protrusion is equal to 8 mm, a width w thereof is equal to 1 mm, the diameter d of the top surface of each trapezoidal protrusion 1b is equal to 4 mm, and the height of each of the protrusions 1a, 1b is equal to 0.15 mm. In the case of using galvanized sheets having plate thickness in a range from 0.6 to 1.2 mm, the gap g between the joining regions can be maintained in the range of 0.1 to 0.2 mm by setting the interval D1 equal to 30 mm or below when the ridge-shaped protrusions 1a are located adjacent to one another.

On the other hand, when the ridge-shaped protrusions 1a and the trapezoidal protrusions 1b are adjacent to one another and when the trapezoidal protrusions 1b are adjacent to one another, the gap g between the joining regions can be maintained in the range of 0.1 to 0.2 mm just by setting the interval D2 equal to or less than 60 mm, which is twice as long as the interval D1. These figures are respectively equivalent to five times or less (regarding D1) and ten times or less (regarding D2) in comparison with a diameter of 6 mm applicable to unit spots 2e in the case of typical spot welding. Accordingly, when the flat surface is ensured across the section equivalent to the above-described interval D2, the number of the protrusions to be formed can be reduced by providing the trapezoidal protrusions 1b, and multiple sessions of unit laser scanning 2c can be performed between the protrusions adjacent to each other.

The embodiment has described the example of welding and joining the rear skirt 10 and the tail end member 20 of the automobile. However, the laser lap welding method according to the present invention is also preferably applicable to welding and joining of other vehicle body panels, constituent parts, reinforcing members, and brackets of automobiles, and moreover, to various other parts made of galvanized steel sheet press-formed in a three-dimensional shape.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A laser lap welding method for parts made of galvanized steel sheet, comprising the steps of:
   press-forming two parts from galvanized steel sheet into three-dimensional shapes such that the two parts include elongated regions to be welded together on mutually opposed surfaces thereof and a plurality of protrusions are formed on at least any one of the elongated regions of the two parts at predetermined intervals in a longitudinal direction of the elongated region, wherein each of the protrusions is formed into a ridge-shape having a ridge line extending in a substantially orthogonal direction to the longitudinal direction of the elongated regions;
   retaining the two parts in a state in which the elongated regions are overlapped one over the other such that a gap according to a height of the protrusions is formed between the elongated regions; and
   irradiating a laser onto one surface of the overlapped elongated regions of the two parts between the protrusions such that the overlapped elongated regions are fused and welded by energy of the laser, and zinc gas produced by fusing is discharged through the gap,
   wherein irradiating the laser includes discrete unit laser scanning each of which is scanned along a curved line surrounding a unit spot of an equivalent area to a welded spot, the unit spot being disposed away from regions where the two parts are in contact with one another.

2. The method according to claim 1, wherein the plurality of protrusions include trapezoidal protrusions each having a flat top surface; an interval between the ridge-shaped protrusions adjacent to one another is equal to or less than five times as long as a diameter of the unit spots; and both, an interval between the ridge-shaped protrusion and the trapezoidal protrusion adjacent to one another, and an interval between the adjacent trapezoidal protrusions, are equal to or less than ten times as long as the diameter of the unit spots.

3. The method according to claim 1, wherein the two parts are panels forming a vehicle body of an automobile, and at least one of the joining regions is a flange provided along a periphery of corresponding one of the panels.

4. A laser lap welding method for parts made of galvanized steel sheet, comprising the steps of:
   press-forming two parts from galvanized steel sheet into three-dimensional shapes such that the two parts include elongated regions to be welded together on mutually opposed surfaces thereof and a plurality of protrusions are formed on at least any one of the elongated regions of the two parts at predetermined intervals in a longitudinal direction of the elongated region, wherein each of the protrusions is trapezoidal and extends in a substantially orthogonal direction to the longitudinal direction of the elongated regions;
   retaining the two parts in a state in which the elongated regions are overlapped one over the other such that a gap according to a height of the protrusions is formed between the elongated regions; and
   irradiating a laser onto one surface of the overlapped elongated regions of the two parts between the protrusions such that the overlapped elongated regions are fused and welded by energy of the laser, and zinc gas produced by fusing is discharged through the gap,
   wherein irradiating the laser includes discrete unit laser scanning each of which is scanned along a curved line surrounding a unit spot of an equivalent area to a welded spot, the unit spot being disposed away from regions where the two parts are in contact with one another.

* * * * *